June 2, 1953     H. A. GIBB     2,640,665

AIRCRAFT TRIM TAB CONTROL

Filed June 2, 1948

Harold A. Gibb
*INVENTOR.*

BY *James M. Clark*

HIS PATENT ATTORNEY

Patented June 2, 1953

2,640,665

UNITED STATES PATENT OFFICE 2,640,665

AIRCRAFT TRIM TAB CONTROL

Harold A. Gibb, San Diego, Calif., assignor to Consolidated Vultee Aircraft Corporation, San Diego, Calif., a corporation of Delaware Application June 2, 1948, Serial No. 30,577

6 Claims. (Cl. 244—82)

The present invention relates to the control of aircraft in flight and more particularly to improvements in trim tab control mechanisms.

In the normal course of flight of a conventionally controlled airplane, it is necessary to constantly and frequently adjust the controls in order that the airplane is balanced or properly trimmed such that it will maintain a desired attitude of flight. There are a number of methods of accomplishing the balancing or trim of an aircraft in flight and the most common is by the use and adjustment of the trim tabs which are usually located at the trailing edges of the control surfaces. These trim tabs are operated by various types of mechanisms and may either be hand operated worm and gear devices, a cable drum with attached cables extending and connected to the trim tabs, or other mechanical, hydraulic or electrical mechanisms and systems.

In order to relieve the load on the control stick, when the attitude of the airplane is changed for any reason during flight, in the conventional manually operated worm and gear mechanism referred to, it is necessary for the pilot to crank the tab control mechanism to the point at which the load on the stick is at a minimum. This procedure is more or less continuous in the normal operation of airplanes, especially those of the larger passenger or transport type wherein the center of gravity is continually shifting due to movements of the passengers about the airplane. Obviously, this is very burdensome and tiring upon the pilot and contributes materially to his fatigue during extended flight periods.

Often the changes in aerodynamic forces on the airplane due to high speed dives, such as are frequently made in military aircraft, are so rapid that the pilot can not keep his airplane in proper trim due to the relatively slow operation of the manually operated tab control mechanisms. The present invention is directed to improvements in the mechanism and operation of trim tab controls as they have been available heretofore and provides a positive control, fast in action, with no effort on the part of the pilot other than the pressing of a switch button in the head of the control stick, or other convenient location. By means of the improved automatic electric trim tab of the present invention, the load on the control stick is relieved and is under the control of the pilot at all times without appreciable effort. A further provision of this invention permits the pilot to operate the primary controls of the airplane when these control forces are beyond his physical strength. And the operation of the present improvement, in conjunction with the changing positions of the primary control surfaces, serves as an automatic boost on the control stick by utilizing the aerodynamic forces on the trim tab to assist in the operation of the control surfaces.

It is, accordingly, a major objective of the present invention to provide an automatic electric trim tab control mechanism, the operation of which is at the discretion of the pilot. A further object resides in the provision of a trim tab which operates to trim all of the control surfaces simultaneously and provides for the manual operation of the tabs exclusive of the automatic control feature, as may be required. Another object of this invention is the provision of means which permits the pilot to place the control device into operation for assistance when the control stick loads are so great that he would be unable to operate them without assistance. A further object resides in providing means initiated by pilot force on the control surface to cause the power actuation of the tab in the proper direction and to provide a solenoid lock in an improved relationship between the pilot control and the power means for the tab.

It is a still further objective of the present invention to provide an improved automatic electric trim tab system capable of operating on either A. C. or D. C. aircraft electrical systems. Another objective is the provision of automatic trim of individual tabs to maximum efficiency exclusive of the function of other tabs or surfaces such as on multiple or parallel tail surfaces and contra-operated flaps. It is also an object to provide such a system of an improved type in which there is adequate "feel" in the controls. These and other advantages and objects will become apparent to those skilled in the art from a study of the following description and the accompanying drawings, forming a part hereof, in which:

Figure 1:
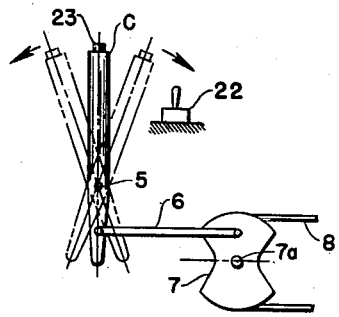
Fig. 1 is a schematic general arrangement view of the mechanical and electrical mechanisms for actuating the trim tab and the control of the associated control surface.

Referring now to Fig. 1, there is shown a form of the present automatic trim tab control as applied to an aircraft elevator. This figure shows the mechanical mechanism of the improved system and only those major electrical elements, the wiring diagrams and connections between the several electrical elements being shown in the succeeding figures. While the preferred embodiment illustrated and described herein is applied to the trim tab control for an aircraft elevator surface, it will be understood that the invention is not limited to elevator surfaces for aircraft but may equally be utilized in connection with the ailerons, rudders and other movable surfaces of aircraft, as well as the surfaces of other mobile vehicles which are similarly steered through fluid media. It will also be noted that while the present improvements are referred to as automatic in operation, they are not fully automatic flight controls in the sense that they may be pre-set to maintain a predetermined direction of flight, but they are operated automatically only at the discretion of, and as initiated by, the pilot or other operator.

Figure 4:
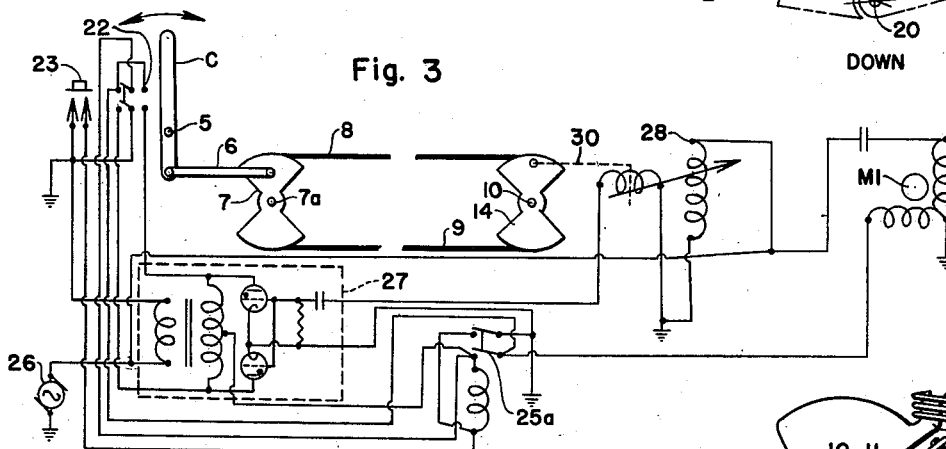
Fig. 4 is an enlarged fragmentary view of a portion of the mechanism shown in Fig. 1.

In Fig. 1, the letter C represents an aircraft control stick or column, the letter W represents the trailing portion of a normally fixed wing, fin or tail surface, while E indicates an elevator pivotally mounted upon the fin and the letter T represents a trailing edge control tab associated with the elevator. The control stick C is mounted for fore and aft rocking about the transverse pivot 5, and is linked by the push-pull rod 6 to the cable sector 7, pivotally mounted upon the aircraft structure at its pivot 7a. The upper and lower cable runs 8 and 9 are each anchored or attached at their forward ends to the forward cable sector 7, and are similarly attached to another but rearward cable sector 14 which is co-axially mounted for limited rotation about the axis 10 of the elevator E. The latter cable sector 14 differs somewhat from the forward sector 7 in that it is provided with a forwardly directed detent portion 14a and a pair of rearwardly and outwardly divergent contactor portions 14b and 14c, as more particularly shown in Fig. 4.

There are fixedly supported upon the fixed structure of the elevator E, a pair of contact switches 11 and 12 which are oppositely disposed between the diverging contactor portions of the control sector 14, and relative movement of the sector 14 about its pivot 10 with respect to the elevator structure is opposed by the outwardly disposed self-centering springs 13. These springs serve to resiliently couple the sector 14 to the control surface E and the relative movement therebetween in the rotational sense about the axis of their common pivot 10 is limited by the adjustable stops 15 and 16 upon the fixed portions of which the contact switches 11 and 12 may be supported. The cable sector 14 is normally locked to the elevator surface E by means of the electric solenoid lock 21 which engages the detent 14a in the sector 14 and normally prevents any relative movement between the element 14 and the surface E.

Carried within the elevator surface E, there is a reversible electric motor M pivotally mounted upon the elevator surface at the pivot 17 and having an extensible screw actuating shaft 19. The motor may alternatively be hydraulic, mechanical or other reversible power means. The rear terminal of the extensible element 19 of the motor M is pivotally connected to the control horn or lever 18 of the tab T which in turn is pivotally mounted upon the trailing portion of the elevator E for rotation about the axis of the tab pivot 20. The normal operation of a tab such as T is relatively well known and it is necessary only to state herein that for upward displacement of the elevator surface E, the tab T is deflected downwardly in order that the turning couple created by its downward deflection will be sufficient to deflect the elevator surface upwardly, as a result of its greater distance from the axis of pivot 10. Tabs such as T have heretofore been utilized both in the servo capacity in which they serve to assist and boost the pilot forces applied to the control surface to which they are hinged, and have also been used as trim tabs for accomplishing balance or trim of the aircraft during flight due to aerodynamic disturbances or internal shifting of the disposable loads affecting the C. G. of the aircraft. It might be stated that in connection with the present invention, the disclosed trim tab T serves both to assist in trimming the airplane, as well as a servo or electrically actuated boost tab in helping the pilot operate the larger and heavier control surface E by the application of relatively small control or stick forces.

In the normal operation of the control surface E, while the sector 14 is locked to the surface by detent 14a and the solenoid 21, the pilot in pushing the control stick C forward, would in turn cause the control surface E to rotate downwardly in the clockwise direction about its pivot 10, thereby causing the nose of the airplane to move down. A reverse or rearward movement of the control stick C will similarly cause the nose of the airplane to move up as a result of the elevator being rotated in the counterclockwise direction into its up position. In each of these operations the tab T will move bodily with the surface E. As is well known, the normal use of the conventional elevator control is for the purpose of controlling the airplane vertically, or the so-called dive control of the airplane, and in normal flight, this control is in continuous use inasmuch as a number of factors cause the airplane to become either nose-heavy or tail-heavy, or in other words to tend to fly nose-down or nose-up, respectively. To maintain the desired altitude of the airplane under these conditions, it is necessary in the conventional control system for the pilot to continually apply pressure to the elevator control. As indicated above, this requirement of continual pressure and attention to the elevator surface, as well as the other control surfaces of the aircraft, has a very tiring effect upon the pilot, particularly during long flights.

In order to avail himself of the advantages of the present improvement, it is merely necessary for the pilot to depress the electric switch button 23 carried within the upper terminal of the control stick C. As more clearly shown in the wiring diagram in Fig. 2, with the line switch 24 closed and the system energized by the D. C. power source 32, closing of the switch 23 serves to energize or operate the relay 25, which in turn energizes the solenoid lock 21, withdrawing the movable element therein forwardly and out of engagement with the detent 14a in the cable sector 14. This serves to unlock or remove the direct mechanical connection between the control stick C and the elevator surface E which now becomes flexibly coupled to the control sector 14 by means of the interposed coil springs 13. When the solenoid lock 21 is opened, the load between the cable sector 14 and the control surface E causes a small relative motion between these two elements due to the centering effect of the coil springs and either switch 11 or 12 is closed.

In the event a nose-up, or tail-heavy, condition exists, the upper switch 11 will be closed as a result of the forward disposition of the control stick C resulting from the pilot's effort to lower the elevator to raise the tail and to thereby correct the nose-up condition. The closing of the upper switch 11 completes the circuit to the electric motor M which operates in the desired direction to move the push-rod 19 inwardly toward the motor to rotate the trim tab T, through its control horn 18, upwardly or in the counter-clockwise direction about its pivot 20. The aerodynamic forces acting upon the upwardly turned tab T are exerted downwardly in the clockwise direction and serve to rotate the control surface E downwardly about its pivot 10 into the down position shown in Fig. 1. During this operation the trim tab T progressively applies the downward force necessary to deflect the control surface E and the load applied by the sector 14 is progressively reduced until upon reaching zero load and also zero deflection, the upper switch 11 opens, the motor M stops the movement of the tab T and the hold-in relay 25 releases. The solenoid lock 21 is thereupon de-energized and engages cable sector 14, the control surface E and the sector 14 are again locked together and prevent recycling of the switches 11 and 12 due to gusts or buffeting.

On the other hand, in the event a nose-down or nose-heavy condition had existed, the lower switch 12 would have been contacted and operated by the sector contact portion 14c and the motor M would have been operated in the reverse direction to transfer the load from the control stick C to the trim tab T as described for the previous operation. The control column or stick C may otherwise be of a conventional type, provided with the manual contact switch 23, and the stick may also desirably be provided with conventional adjustable mechanical stops (not shown) which are adjustable to control the travel or throw of the control stick C about its pivot 5.

It will, accordingly, be noted from the foregoing description that actuation of the switch 23 by the pilot serves to break the direct mechanical connection between the cable control and the control surface E and permit control of the direction and operation of the motor and the tab by means of the relative movement between the elevator and the sector 14 as controlled by the stick C. This operation may preferably be referred to as the automatic electric trim tab control operation, as initiated by the pilot operation of the control stick and its attached switch button 23.

In the event it is desired to manually operate the system, as distinguished from the above automatic operation, by direct control of the electric motor M, the pilot closes the direct control double-pole doublethrow switch 22 (Fig. 2) which may be suitably supported upon adjacent fixed structure convenient to and within easy reach of the pilot. As will be noted from the wiring diagram in Fig. 2, this switch is so connected that it will serve to override or superimpose the pilot control upon the aforementioned automatic control by means of the relay 29. This manual operation may preferably be utilized in those circumstances where the pilot desires to discontinue the trim operation before it has reached completion and has automatically stopped.

It might also be stated that in a still further modification of the present invention, it is possible to alternatively control the motor M directly from the control stick C in the event of cable or other control mechanism failure by the provision of contact switches disposed on either side of the control stick C and connecting the same to the corresponding reversing leads of the motor M. This emergency operation would be concluded by the substitution of a doublethrow switch for the single throw line switch shown at 24, the closing of this switch in the opposite direction removing the automatic trim tab control from the source of power, and connecting the power source to the emergency circuit. To operate this emergency system, the pilot pushes or pulls the control stick C which in turn operates either one of the fore or aft contact switches, such that when the stick C is pushed forward, the motor M is operated to move the trim tab T up at the trailing edge, which in turn operates the elevator surface E downwardly. When the desired position of the elevator surface is attained, the control stick C is returned to its neutral or central position and the motor and tab movement stop when the contact switch is again opened and becomes inoperative. Operation of the elevator surface in the opposite direction is similarly accomplished by movement of the control stick C in the aft direction.

Figure 3:
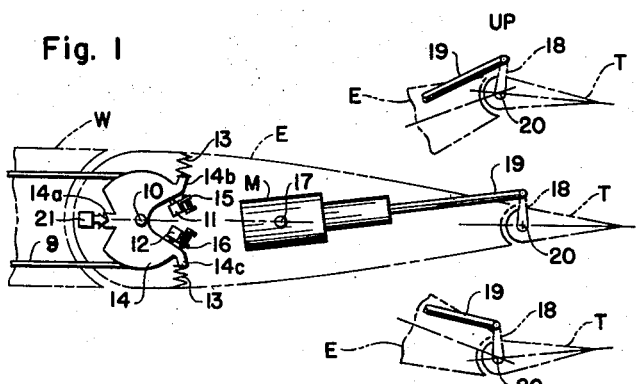
Fig. 3 is an alternative diagram showing the wiring for a tab control system utilizing an A. C. power source.
Figure 2:
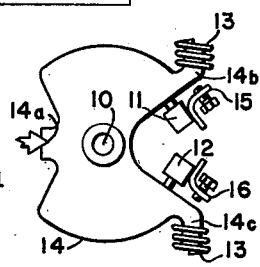
Fig. 2 is a diagrammatic view showing the electrical wiring for the operation of the tab control system shown in Fig. 1.
Figure 5:
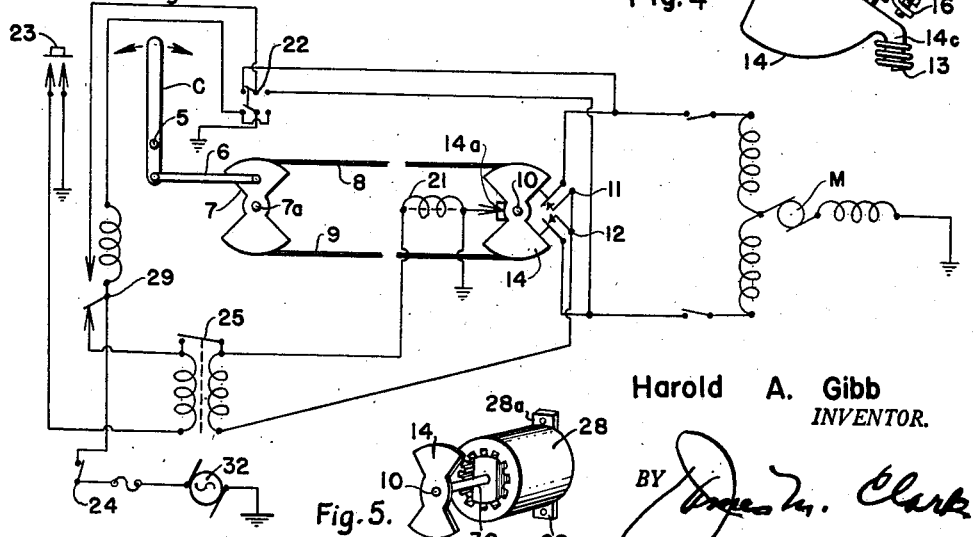
Fig. 5 shows in detail the device for coupling the sector and elevator elements of Fig. 3.

Whereas in Fig. 2, there has been shown the wiring diagram for the operation of the control trim tab from a D. C. source of electric power, there is alternatively shown in Fig. 3, the operation of the system from an A. C. source of power. In this latter system, shown in Fig. 3, the numeral 26 represents the A. C. power source and the numeral 27 is an electronic device for control of a two phase reversing motor M1. A phase shifting transformer 28, shown in detail in Fig. 5, and mounted upon the control surface structure by means of the lugs 28a, is substituted for the contact switches 11 and 12 as shown in Figs. 1 and 2, for the D. C. system, and the previously provided solenoid lock 21 is not required in the A. C. system, inasmuch as there is no wear on the phase shifting device when the control surface moves, due to buffeting or gusts. One of the relatively movable elements of the phase shifting transformer 28 is coupled by the mechanical linkage 30 (shown in dotted lines) with the control sector 14. The doublepole hold-in relay 25a serves the same function as the relay 25 in Fig. 2, that is, when the no-load condition exists, the system is stopped and disconnected until re-engaged.

In normal operation the pilot applies control forces at the top of control stick C which is pivoted at 5 and linked to sector 7 by link rod 6. Sector 7 is located near the cockpit and is coupled to sector 14 which is located near the surface to be controlled by cable 8. Sector 14 in turn is coupled to elevator E (in Fig. 1) through a coupling 30 that allows a relative movement of sector 14 with elevator E that is proportional to force required to deflect E. This relative movement causes a corresponding movement of the two coils in load sensing pick-off device 28. When the rotating coil of pick-off 28 is in neutral (null or no control load condition) zero voltage is applied to the grids of thyratron tubes in the amplifier 27. If, however, the pilot applies control forces to elevator E, a corresponding rotation is produced in pick-off 28 and voltage is applied to the grids of the thyratron tubes in amplifier 27 and the output of amplifier 27 will produce a rotation of motor M1. The direction of rotation of motor M1 is dependent upon the phase of the voltage from pick-off 28. It follows that motor M1 is linked to trim tab T (Fig. 1) in a manner identical to that of motor M (in Fig. 1) and drives tab T to a position that will remove the pilot's stick load by maintaining the control surface E at the desired position with minimum stick load. When this condition is reached the voltage from pick-off 28 will have returned to zero (null) and the motor will stop until a new pilot's stick load is established. The above description is typical of the operation when relay 25a is in the operated condition (energized by holding down button 23 located on the control stick or adjacent thereto). Button 23 is incorporated into the system to permit the pilot to engage automatic trim at will. If a stick load exists at the time button 23 is pressed relay 25a will lock in and operate motor M1 to position the tab T to a point that will remove stick load at C. When the balanced condition exists the output of amplifier 27 falls to zero and relay 25a is de-energized and automatically disconnects amplifier output until it is again selected by the pilot pressing button 23. Switch 22 is added to the system to permit the pilot to manually control the trim tab T to any desired position in event of failure of the automatic system.

It will, accordingly, be noted that the present invention provides a simple and efficient electrically operated automatic trim control of any control surface at the discretion of the pilot. It also provides for the manual operation of trim control instantly whenever required and is either operable on A. C. or D. C. current systems as provided in aircraft. It will also be noted that this invention accomplishes the trimming of each individual control surface separately, and simultaneously, as well as automatically, to its zero load position, which result has not heretofore been efficiently accomplished by other known systems. The present invention also materially assists the pilot in the operation of the controls when the load on the control stick becomes excessive or beyond his strength to operate effectively. The disclosed systems are applicable to any type of airplane and more particularly on the larger type aircraft utilizing parallel control surface installations.

Other forms and modifications of the present invention both with respect to its general arrangement and the details of its respective parts are intended to fall within the scope and spirit of this invention as more particularly defined in the appended claims.

I claim:

1. In an aircraft control system, a movable control member, a control surface pivotally mounted upon the aircraft, an actuating element pivotally mounted for limited rotational movement with said control surface and with respect to said control surface, actuating mechanism operatively connected to said control member and to said actuating element, resilient means interposed between said actuating element and said control surface to resiliently oppose said relative movement therebetween, a detent carried by said actuating element, and an electric solenoid means mounted upon said control surface operable from said control member and engageable with said detent for selectively locking or unlocking said actuating element to said control surface.

2. In an aircraft having a sustaining surface, a movable control surface hingedly mounted upon said sustaining surface, a tab surface hingedly mounted upon said movable control surface, a member pivotally mounted upon said control surface normally connected by releasable locking means to said control surface for concurrent movements therewith, resilient means opposing relative movement of said member with respect to said movable control surface, control mechanism operatively connected to said pivotally mounted member for moving said control surface with respect to said sustaining surface, power means for the power actuation of said tab surface, said releasable locking means carried by said control surface including a detent selectively engageable with said pivotally mounted member for permitting limited resiliently opposed relative movements between said pivotally mounted member and said control surface, and automatic means including contact switches carried by said control surface in circuit with said power means initiated by said resiliently opposed relative movements of said pivotally mounted member with respect to said control surface for initiating the power of actuation of said tab surface by said power means.

3. In an aircraft having a sustaining surface, a movable control surface hingedly mounted upon said sustaining surface, a tab surface hingedly mounted upon said movable control surface, a manual control element, a controlled member pivotally mounted upon said control surface releasably connected to said control surface for concurrent movements therewith, control mechanism operatively connecting said manual control element with said controlled member for moving said control surface with respect to said sustaining surface, resilient means mounted upon said control surface opposing relative movement of said pivotally mounted controlled member with respect to said control surface, power means pivotally mounted upon said control surface for the power actuation of said tab surface, solenoid-actuated locking means mounted upon said control surface including a detent carried by said control surface selectively engageable with said controlled member for direct manual control of said control surface by said manual control element, selective disengagement of said locking means permitting limited resiliently opposed relative movements between said pivotally mounted controlled member and said control surface, and automatic means carried by said control surface initiated by contact with said pivotally mounted controlled member upon said relative movements of said pivotally mounted controlled member with respect to said control surface for initiating the power actuation of said tab surface by said power means in a direction determined by the manual movement of said manual control element and said connected pivotally mounted controlled member.

4. In a control system for an aircraft, a control member, a control surface pivotally mounted upon the aircraft, a tab surface pivotally mounted upon said control surface, power means carried by said control surface for the actuation of said tab surface, operating mechanism connected to said control member and normally directly connected to said control surface by a releasable latch engaging a detent carried by said operating mechanism, means flexibly coupling said operating mechanism to said control surface in the disengaged condition of said latch with respect to said detent, remote control means associated with said control member for selectively operating said latch for engagement or disengagement of said detent for the locking or unlocking of said control surface with respect to said operating mechanism, and means associated with said operating mechanism initiated by relative movement of said operating mechanism with respect to said control surface as permitted by said flexible coupling for actuation of said power means for moving said tab surface in the direction corresponding to that of the relative movement of said control surface with respect to said operating mechanism.

5. In an aircraft, a fixed surface, a movable control surface, a tab surface hinged to said movable control surface, control mechanism for moving said control surface with respect to said fixed surface, said control mechanism including an element mounted upon said control surface for relative movement with and with respect to said movable control surface, resilient means carried by said control surface arranged to resiliently oppose relative movement of said control mechanism element with respect to said control surface, power means carried by said control surface for the power actuation of said tab surface, locking means including a detent operatively carried by said control surface and selectively disengageable from said control mechanism element for releasing said element for resiliently opposed relative movement with respect to said control surface, and automatic means initiated by said relative movements of said control mechanism element with respect to said control surface in the disengaged condition of said locking means for the power actuation of said tab surface.

6. In an aircraft having a sustaining surface, a movable control surface hingedly mounted upon said sustaining surface, a tab surface hingedly mounted upon said movable control surface, a manual control element, a controlled member pivotally mounted upon said control surface, said controlled member having a recess formed therein, control mechanism operatively connecting said manual control element with said controlled member, locking means mounted upon said control surface including a movable detent carried by said control surface selectively engageable with and disengageable from said recess in said controlled member for accomplishing connected and released conditions, respectively, of said controlled member, resilient means disposed between said controlled member and said control surface for centering said controlled member with respect to said control surface and arranged to provide for limited resiliently opposed relative movements between said controlled member and said control surface in the released condition of said locking means, electric power means for the power actuation of said tab surface with respect to said control surface, automatic switching means cooperatively mounted between said controlled member and said control surface operatively connected to said power means initiated by said resiliently opposed relative movement of said controlled member with respect to said control surface in the released condition of said locking means arranged for the power actuation of said tab surface by said power means and manual switching means connected across said automatic switching means arranged for the direct electrical control of said power means for the controlled movement of said tab surface without the necessity of the manual operation of said control element and said controlled member.

HAROLD A. GIBB.

References Cited in the file of this patent

UNITED STATES PATENTS

| Number | Name | Date |
|---|---|---|
| 2,183,932 | Carlson | Dec. 19, 1939 |
| 2,325,548 | Roos et al. | July 27, 1943 |

FOREIGN PATENTS

| Number | Country | Date |
|---|---|---|
| 571,979 | Great Britain | Sept. 18, 1945 |
| 572,494 | Great Britain | Oct. 10, 1945 |
| 882,985 | France | Mar. 15, 1943 |